United States Patent [19]
Hill et al.

[11] Patent Number: 6,023,714
[45] Date of Patent: Feb. 8, 2000

[54] METHOD AND SYSTEM FOR DYNAMICALLY ADAPTING THE LAYOUT OF A DOCUMENT TO AN OUTPUT DEVICE

[75] Inventors: William Hill, Carnation; Simon D. Earnshaw, Seattle; Simon J. Daniels, Seattle; David M. Meltzer, Seattle, all of Wash.

[73] Assignee: Microsoft Corporation, Redmond, Wash.

[21] Appl. No.: 08/847,427

[22] Filed: Apr. 24, 1997

[51] Int. Cl.[7] .................................................. G06F 17/21
[52] U.S. Cl. .......................... 707/513; 707/501; 707/517; 345/342
[58] Field of Search ..................................... 707/513, 514, 707/526, 528–531, 515, 522–523, 501; 345/339, 340–342, 348–351; 395/109, 110, 117, 200.31–39

[56] References Cited

U.S. PATENT DOCUMENTS

| | | | |
|---|---|---|---|
| 5,557,722 | 9/1996 | DeRose et al. | 395/148 |
| 5,644,776 | 7/1997 | DeRose et al. | 707/500 |
| 5,719,786 | 2/1998 | Nelson et al. | 364/514 |
| 5,835,712 | 11/1998 | DuFresne | 395/200.33 |
| 5,860,073 | 1/1999 | Ferrel et al. | 707/522 |
| 5,899,975 | 5/1999 | Nielsen | 704/260 |
| 5,943,680 | 8/1999 | Shimizu et al. | 707/528 |

OTHER PUBLICATIONS

Dick Oliver, Netscape 2 Unleashed, pp. 464, 470, 471, Feb. 1996.

Richard Scott, Windows NT 4 Workstation, pp. 192–193, 1996.

Raggett et al., "HTML and Style Sheets," W3C Working Draft, Mar. 24, 1997, WD–style–970324.

Lie et al., "Cascading Style Sheets, Level 1," W3C Recommendation, Dec. 17, 1996, REC–CSS1–961217, (Feb. 26, 1997), pp. 1–66.

*Primary Examiner*—Stephen S. Hong
*Assistant Examiner*—Cong-Lac Huynh
*Attorney, Agent, or Firm*—Jones & Askew, LLP

[57] ABSTRACT

Dynamically adapting the layout of a document to a particular output device. The layout of a document can be adapted to a particular output device so that the document fully utilizes the capabilities of the output device. A layout generator interrogates the output device to determine the capabilities of the output device. Based upon the capabilities of the output device, the layout generator selects a style sheet to accommodate the particular output device. The style sheet assigns values to format properties such as font properties, color and background properties, and text properties. The layout of the document is adapted to the particular output device by rendering the document on the output device using the values defined in the style sheet.

34 Claims, 6 Drawing Sheets

METHOD AND SYSTEM FOR DYNAMICALLY ADAPTING THE LAYOUT OF A DOCUMENT TO AN OUTPUT DEVICE

FIELD OF THE INVENTION

This invention relates in general to dynamically adapting the layout of a document to a particular output device, and in particular to adapting the layout of a document to fully utilize the capabilities of a particular display device.

BACKGROUND OF THE INVENTION

Creating a document for distribution over a network such as the Internet may be a frustrating endeavor for an author. In addition to composing the content of the document, an author must design the format for the document. The format defines the appearance and the placement of the content of the document and should be designed to enhance the content and usability of the document. Typically, the format defines the size of the margins, the size and font of the characters and the colors of the document. If the document is intended for a single medium such as print, then the format may be optimized for that particular medium. If the format is optimized for print, then the format takes into account physical constraints such as the size of the paper and output device capabilities such as the colors and fonts supported by the printer. However, with the advent of large networks such as the Internet, a document may be intended for a variety of media and a variety of output devices. For example, a document distributed over the Internet may be displayed on a variety of display devices and may be printed on a variety of printers. If a document is intended for a variety of media or output devices, then a single static format cannot be optimum for all the intended uses. For example, a format optimized for a printed document may be different than a format optimized for a computer-displayed document. In addition, a format optimized for a large high resolution display may be different than a format optimized for small personal digital assistant.

An author of a document distributed over a network may not know what type of device a user will employ to output the document. To accommodate the largest number of output devices, an author may design a format which utilizes only the most basic output device capabilities. Although the resulting format may work with a large number of devices, the format is a compromise and may not be optimum for any of the output devices.

One solution to formatting documents for distribution over a network, is to create a document using a generalized markup language such as Hypertext Markup Language ("HTML"). HTML allows an author to define the structure of a document using tags. Although HTML does not provide an author with direct control over the format of a document, HTML allows the author to advise or suggest ways the document should be formatted through the use of HTML tags. The format of the document is ultimately controlled by user-installed software commonly referred to as a browser. One example of a browser is the "INTERNET EXPLORER" browser distributed by Microsoft Corporation of Redmond, Wash. A browser recognizes the HTML tags and formats the document using the HTML tags and the browser parameters.

An advantage of HTML is that it is platform independent, so the content of an HTML document may be displayed on a number of different display devices using a number of different browsers. However, the structure of an HTML document is static. The author creates HTML tags which advise ways the document should be formatted. The same tags are used regardless of the capabilities of the output device or the browser. Because the tags do not take into account the physical size of the display or the browser window or the capabilities of the display device, the format is not optimized for a particular display device. Although HTML allows a document to be displayed on a large number of display devices, HTML does not provide an optimum format for a particular display device.

Accordingly, there is a need in the art for dynamically formatting a document based upon the capabilities and constraints of a particular output device.

SUMMARY OF THE INVENTION

The present invention meets the needs described above by providing a method for dynamically formatting a document based upon the capabilities and constraints of a particular output device. One embodiment of the present invention adapts the layout of a document to a particular display device so that the document fully utilizes the capabilities of the display device. The layout of the document is adapted to the particular display device by selecting a style sheet based upon the capabilities of the display device and displaying the document using the selected style sheet.

An exemplary system for dynamically adapting the layout of a document to a display device may include a client, a server, a document, a layout generator and multiple style sheets. The client and the server are typically connected via a network. The document specifies the content of the document as well as the structure of the document. Typically, the document is an HTML document that includes embedded tags to define the structural elements of the document. The layout generator may be executed by either the client or the server. If the layout generator is executed on the client, then the client interrogates the display device and selects a style sheet. If the layout generator is executed on the server, then the server interrogates the display device and selects a style sheet. The display device is interrogated to determine the capabilities of the output device.

Based upon the capabilities of the display device, one of the style sheets is selected. The style sheets typically define format values for the format properties of the elements of the document. Typical format properties include text properties, font properties and color properties. For example, a style sheet may define the font size for a level-one header and the background color for the body of the document. Different style sheets may define different values for the same format property. For example, one style sheet may define format values appropriate for a high resolution display device, a second style sheet may define format values appropriate for a medium resolution display device, and the third style sheet may define format values appropriate for a low resolution display device. Once the layout generator selects a style sheet, the client displays the document on the display device coupled to the client using the selected style sheet.

Another exemplary system for dynamically adapting the layout of a document to a display device includes a style generator which dynamically generates style definitions and a style sheet rather than selecting a style sheet from a plurality of style sheets. The style generator is typically included in the layout generator. Each style definition defines a format value for a format property of an element of the document. The style generator creates a style sheet by creating style definitions appropriate for the capabilities of the display device.

The layout generator is executed by the client in the client-controlled embodiment. In the client-controlled embodiment, the client requests a document from the server. The client receives the document and a layout generator from the server. The layout generator interrogates the output device to determine the capabilities of the output device. Based upon the capabilities of the output device, the layout generator selects a style sheet. The client requests the selected style sheet from the server and then renders the document on the output device using the selected style sheet.

Alternatively, the layout generator may be executed by the server in the server-controlled embodiment. In the server-controlled embodiment, the server receives a document request from the client. In response to the document request, the server retrieves the document and the layout generator. The layout generator interrogates the display device attached to the client to determine the capabilities of the output device. Based upon the capabilities of the output device, the layout generator selects one of the style sheets. The server sends the document and the selected style sheet to the client and the client renders the document on the output device using the selected style sheet.

In either the client-controlled embodiment or the server-controlled embodiment, the layout generator may include a style generator to create a style sheet. If the layout generator includes a style generator, then the layout generator creates a style sheet rather than selecting a style sheet. The style generator creates a style sheet by generating style definitions appropriate for the capabilities of the display device and collecting the style definitions in a style sheet. Each style definition defines a format value for a format property of an element of the document.

Both the client-controlled embodiment and the server-controlled embodiment may be implemented using different types of layout generators and different types of style sheets. The layout generator may be either embedded in the document or may be external to the document. The style sheet may be either external to the document or embedded in the document.

These and other aspects, features and advantages of the present invention may be more clearly understood and appreciated from a review of the following detailed description of the disclosed embodiments and by reference to the appended drawings and claims.

DETAILED DESCRIPTION

The present invention is directed toward a system and method for dynamically adapting the layout of a document to a particular output device. In one embodiment, the invention may be used to adapt the layout of a document to a particular display device so that the format of the document fully utilizes the capabilities of the display device. Briefly described, the present invention includes a layout generator which interrogates the display device to determine the capabilities of the display device. Based upon the capabilities of the display device, the layout generator selects a style sheet to accommodate the particular display device. The style sheet assigns values to format properties such as font properties, color and background properties, and text properties. The layout of the document is adapted to the particular display device by rendering the document using the values defined in the style sheet.

Exemplary Computing Environment

Figure 1:
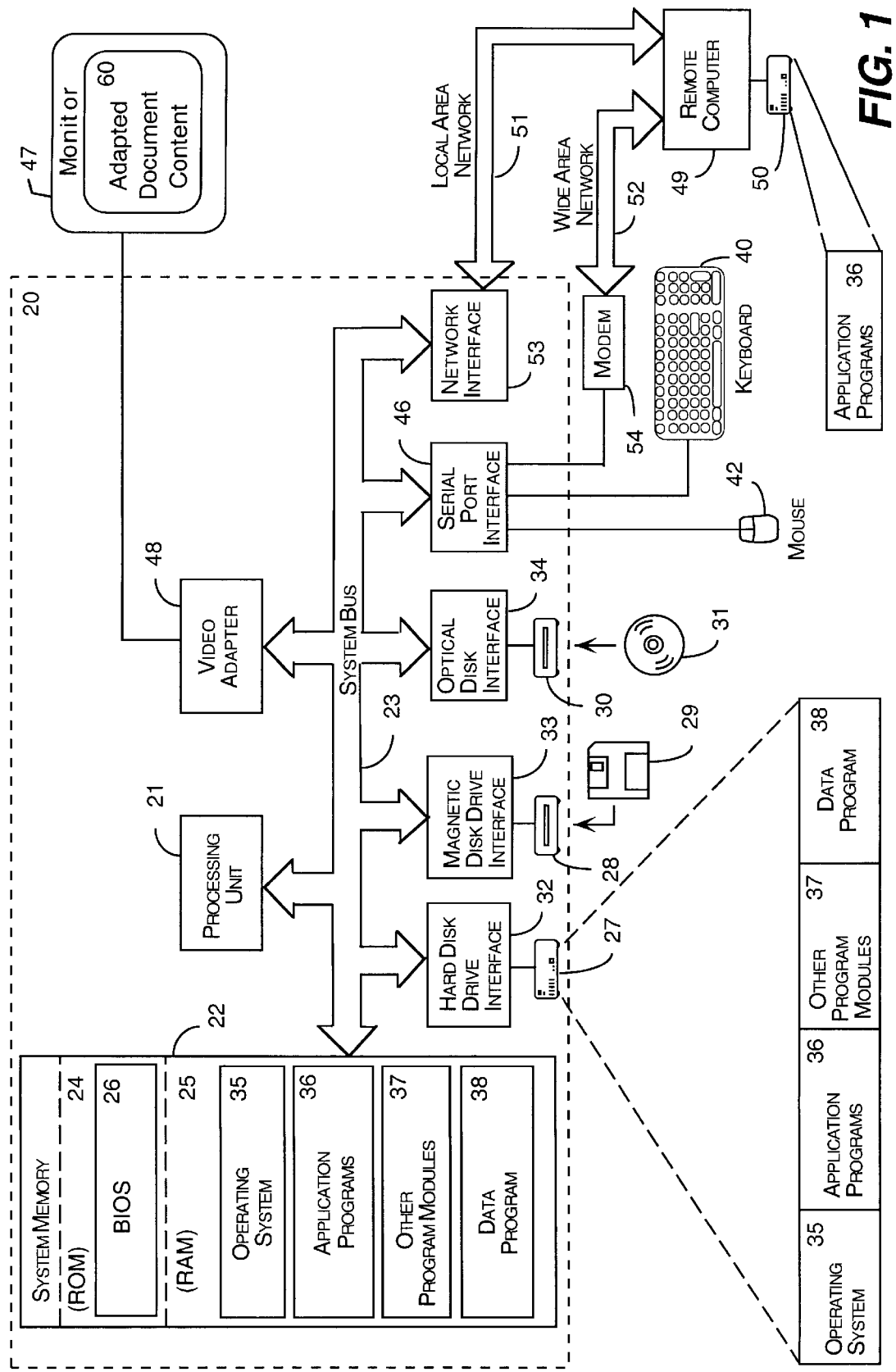
FIG. 1 is a block diagram of a personal computer illustrating the operating environment for an embodiment of the present invention.

FIG. 1 and the following discussion are intended to provide a brief, general description of a suitable computing environment in which the present invention may be implemented. While the present invention will be described in the general context of a networking environment, those skilled in the art will recognize that the invention also may be implemented in other environments. In a networking environment, tasks are performed by remote processing devices that are linked through a communications network. Program modules may be located in both local and remote memory storage devices. Generally, program modules include routines, programs, components, data structures, etc. that perform particular tasks or implement particular abstract data types. The invention may also be practiced in the context of an application program that runs on an operating system in conjunction with a personal computer or in combination with other program modules. Moreover, those skilled in the art will appreciate that the invention may be practiced with other computer system configurations, including hand-held devices, multiprocessor systems, microprocessor-based or programmable consumer electronics, minicomputers, mainframe computers, and the like.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers. The present invention adapts the layout of document content 60 for a particular peripheral output device such as a monitor 47.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Networking Environment

In a networking environment, a user may access a document stored on a remote storage device. The document may be presented to the user by displaying the document on a display device coupled to a client system or printing the document on a printer coupled to a client system. A program module commonly referred to as a browser is generally used to display the document on a display device. A number of different browsers are available such as the "INTERNET EXPLORER" browser distributed by Microsoft Corporation of Redmond, Wash. The format of a document may differ depending upon the browser used to render the document. Although the content of the document remains the same, the display properties such as color, font family and letter spacing may vary. Typically, a browser allows a user to customize the display properties used by the browser to display a document on the client system. However, different user customizations may cause a document to appear differently on different client systems even though the client systems use the same browser.

HTML

To insure that a document may be displayed by the largest number of users, an author may create a document using a generalized markup language such as Hypertext Markup Language ("HTML"). HTML allows an author to specify the content of a document independent of the browser or computer system used by the user, i.e., HTML is platform independent. In addition to text, HTML documents may contain links to images or other documents. A hypertext link ("hyperlink") is used to link the HTML document to an image or to another document.

HTML defines the syntax and placement of special embedded directions or HTML elements that are not displayed by the browser. These HTML elements advise the browser as to how to display the contents of the document by defining the structure of the hypertext-enabled document. HTML elements are commonly referred to as tags. An HTML tag includes a tag name followed by an optional list of tag attributes. The tag name and any attributes are enclosed within brackets (< >). For example, the head of a document is defined by the head tag (<HEAD> . . . </HEAD) and the body of the document is defined by the body tag (<BODY> . . . </BODY). The structure of the body of the document is defined using additional tags such as the paragraph tag (<P> . . . </P>) and the level n header tag (<Hn> . . . </Hn>).

HTML is designed to structure documents to make the content of the documents more accessible. HTML is not designed to provide an author with direct control over the format of a document. However, HTML does provide tags which allow the author to advise or suggest ways the document should be formatted by the browser. For example, the emphasis tag (<EM> . . . </EM>) indicates that the enclosed text should be formatted with additional emphasis and the italics tag (<I> . . . /<I>) indicates that the enclosed text should be formatted in an italic typeface. To display an HTML document on a display device, a browser recognizes the HTML tags and formats the document using the HTML tags and any user-defined browser parameters.

In addition to defining the structure of a document, HTML tags may be used to establish hyperlinks. For example, a hyperlink to an image is typically defined by an image tag (<IMG>). The image is identified by a unique network address commonly referred to as a universal resource locator ("URL"). Similarly, a hyperlink to another document may be defined by the link tag (<LINK>). The linked document is identified by the URL for the linked document.

Style Sheets

HTML is not designed to provide an author with direct control over the format of a document. An author may control the format of an HTML document, however, by creating a style sheet for the HTML document. A style sheet is a collection of style definitions which provides instructions for formatting a document. A style sheet does not contain any document content, only instructions for formatting document content. Typically, the document content is displayed on a display device. A style sheet may define the format properties of a document such as font properties (font family, font style, font variant, font weight, font size), color and background properties (background color, background position), text properties (word spacing, letter spacing), and page properties (columns, page margins). Typically, a style sheet includes a number of style definitions or style rules. Each style definition corresponds to a formatting property such as a font property. A style sheet may be created using a style sheet language such as Cascading Style Sheets ("CSS"). Other style sheet languages include DSSSL (Document Style Semantics and Specification Language) and JASS (Javascript Accessible Style Sheets). CSS supports cascading style sheets and is specifically designed for the presentation on a display device of documents distributed over a network such as the Internet. To display a document using a style sheet on a client system, the browser on the client system must support the style sheet language.

A CSS style sheet for an HTML document includes style definitions which define values for properties associated with HTML tags. For example, a simple CSS style definition for specifying the color of a level-one header as blue is shown below:

H1 {color:blue}

A style definition includes two main parts, a selector and a declaration. In the style definition shown above, the selector is "H1". Any HTML tag may be a selector. The declaration is "color:blue." The declaration includes a property, "color" and a value "blue".

A style sheet may define the formatting properties for any portion of an HTML document which is identified by an HTML tag such as the paragraph tag and the level-n header tag described above. Extensions to HTML 3.2 may include additional HTML tags and attributes which may be used in connection with style sheets to format the content of an HTML document. Proposed extensions include new attributes such as the CLASS attribute and the ID attribute. The CLASS attribute and the ID attribute are common attributes meaning that they may be included in any HTML tag. The CLASS attribute allows an author to group HTML elements in a class by including a CLASS attribute in the HTML tags. The properties and values for the class may be specified in a style definition and are applied to all HTML elements which are included in the class. Typically, the ID attribute is used to define a unique style for an element. The properties and values for the ID attribute may be specified in a style definition and may be applied to the HTML element which includes the ID attribute.

In addition to new attributes, proposed HTML extensions also include new HTML elements such as the span tag (<SPAN> . . . </SPAN>) and the division tag (<DIV> . . . </DIV>). The span tag allows an author to define a portion of text as a structure, for example, a few words in a paragraph. A style definition may then define the properties for the specific words in the paragraph specified in the span tag without affecting the properties for the remaining words in the paragraph. The division tag allows an author to identify block level elements such as paragraphs, headers, and tables as part of a division. The division element is useful for defining chapters or sections of a document. The division tag may be used in conjunction with the class attribute so that properties defined for a class may be applied to the elements contained in the division tag.

A style sheet may be external to the HTML document or may be embedded in the HTML document. If a style sheet is external to the HTML document, then the link element (<LINK>) may be used to link a style sheet to an HTML document. The link tag must appear in the head of the HTML document. The LINK element shown below links a style sheet to an HTML document. The style sheet is entitled "HiRes" and defines properties appropriate for displaying a document on a high resolution display device.

<LINK TITLE="HiRes" REL=stylesheet HREF="HiRes.style"
        TYPE="text/css">

The specific style sheet is identified by the URL HiRes.style which is specified in the HREF attribute of the link tag. The title of the style sheet is HiRes and is specified in the TITLE attribute. A relationship attribute (REL) defines the relationship between the HTML document and the linked document. Values for the relationship attribute include index, glossary and style sheet. In this example, the REL attribute indicates that the linked document is a style sheet. The optional TYPE attribute may be used to specify the Internet Media type for the style sheet. In this example, the TYPE attribute specifies a CSS style sheet.

An advantage of using an external style sheet is that a single style sheet may be used for multiple HTML documents. However, if a document has a unique style, then it may be preferable to embed the style sheet in the HTML document. Proposed extensions to HTML include a style element (<STYLE> . . . </STYLE>) and a STYLE attribute (STYLE). Either the style tag or the STYLE attribute may be used to embed style definitions in an HTML document. The style element may be placed in the document head to embed a style sheet. An example of a style element is shown below.

<STYLE TYPE="text/css">
        H1   {color: blue; font-weight: bold}
        P    {color: yellow }
    </STYLE>

In this example, the style tag contains two style definitions. The first style definition specifies that all level-one headers are blue and bold. The second style definition specifies that all paragraphs are yellow. As shown in the style tag, a style element may contain multiple style definitions and a single style definition may contain multiple declarations.

As an alternative to using a style tag in the head, STYLE attributes may be specified in any body tag. For example, rather than using the style element shown above, a STYLE attribute may be used inside a paragraph tag as shown below.

<P STYLE="color:yellow">

However, in this example, only the paragraph with the STYLE attribute is yellow. To render every paragraph in the document yellow, the STYLE attribute must be included in every paragraph tag. An advantage to embedding style definitions in the HTML document is that all the necessary information for displaying the document is in a single file. A disadvantage to embedding style definitions in the HTML document is that the size of the content document is increased.

Script

A script is a program module which augments the capabilities of HTML by providing active document controls. Active document controls permit a document to interact with events, objects and actions. For example, a script may display a background appropriate for the time of day by checking the time of day and then selecting a background based upon the time of day.

If a script is associated with an HTML document, then the script may modify the HTML document. Similarly, if a script is associated with a style sheet, the script may modify the style sheet. A script may be written in a scripting language such as the Visual Basic language distributed by Microsoft Corporation or the Javascript language distributed by Netscape Communications Corporation. A script is typically embedded in an HTML document. However, future extensions to HTML may include linking an external script to an HTML document using an HTML tag.

Adaptive Display Embodiments

One embodiment of the present invention adapts the layout of a document to a particular display device so that the document fully utilizes the capabilities of the display device. The document may be an HTML document distributed in a networking environment such as an intranet or the Internet. The layout of the document is adapted to the particular display device by selecting a style sheet based upon the capabilities of the display device. The style sheet defines values for the properties of the HTML elements used in the document.

Figure 2:
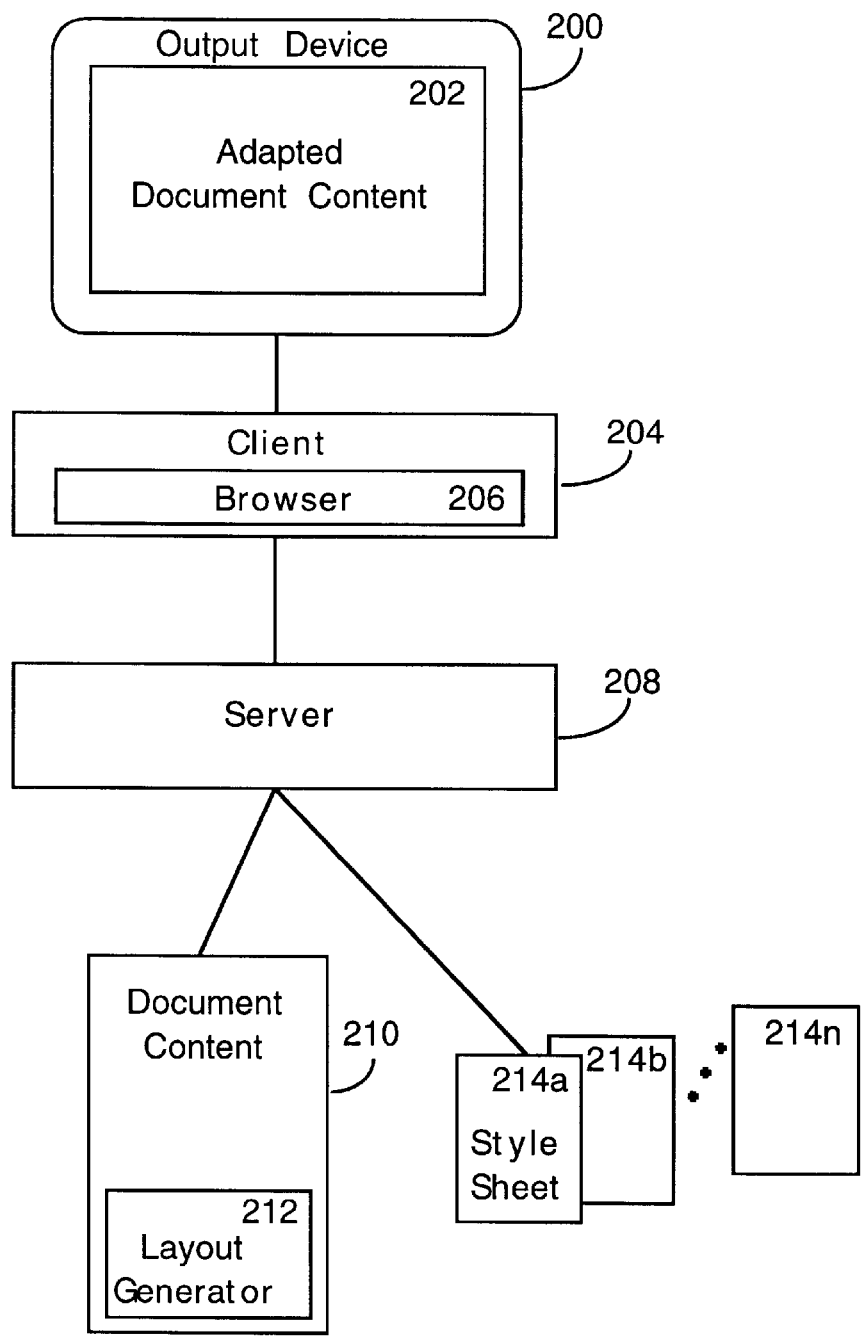
FIG. 2 is a block diagram illustrating an exemplary networking environment for an embodiment of the present invention.

An exemplary networking environment supporting the adaptive display embodiment is illustrated in FIG. 2. The system includes a client 204 and a server 208. The client may be the personal computer 20 and the server may be the remote computer 49 operating in a networked environment as described in connection with FIG. 1. The client renders a document 210 obtained from a remote storage device on an output device 200 coupled to the client 204 using a presentation component, such as a browser 206. In the system illustrated in FIG. 2, the output device is a display device. The document 210 specifies the content of the document as well as the structure of the document. The document may be an HTML document which uses HTML tags to define the structure of the document.

As shown in FIG. 2, the document 210 may contain an embedded layout generator or script 212. The layout generator 212 interrogates the display device 200 and selects a style sheet 214a, 214b . . . 214n based upon the capabilities of the display device 200. The capabilities of the display device may include resolution, size and color palette. The capabilities may also include user-defined browser parameters, such as the size of browser window and the browser font size. By including any user-defined browser parameters, the document may be adapted to both the display device and the browser. For example, a sight impaired user may define a large browser font size so that a computer-displayed document is easier to read. If the user-defined font size is provided to the layout generator, then the layout generator can take the font size into account when selecting a style sheet. The style sheets 214a, 214b . . . 214n define values for properties of the HTML elements of the document. Different style sheets may include different values for properties. For example, each style sheet may define a value for a font size for a level-one header. A first style sheet 214a may define a first value for the font size, a second style sheet 214b may define a second value for the font size, and a third style sheet 214c (not shown) may define a third value for the font size. The first style sheet 214a may be selected for a high resolution display device, the second style sheet 214b may be selected for a medium resolution display device, and the third style sheet 214c may be selected for a low resolution display device. Once the style sheet is selected, the client 20 uses the style sheet to render the document 210 on the display device 200 so that the format of the document content 202 is adapted for the display device.

Figure 3:
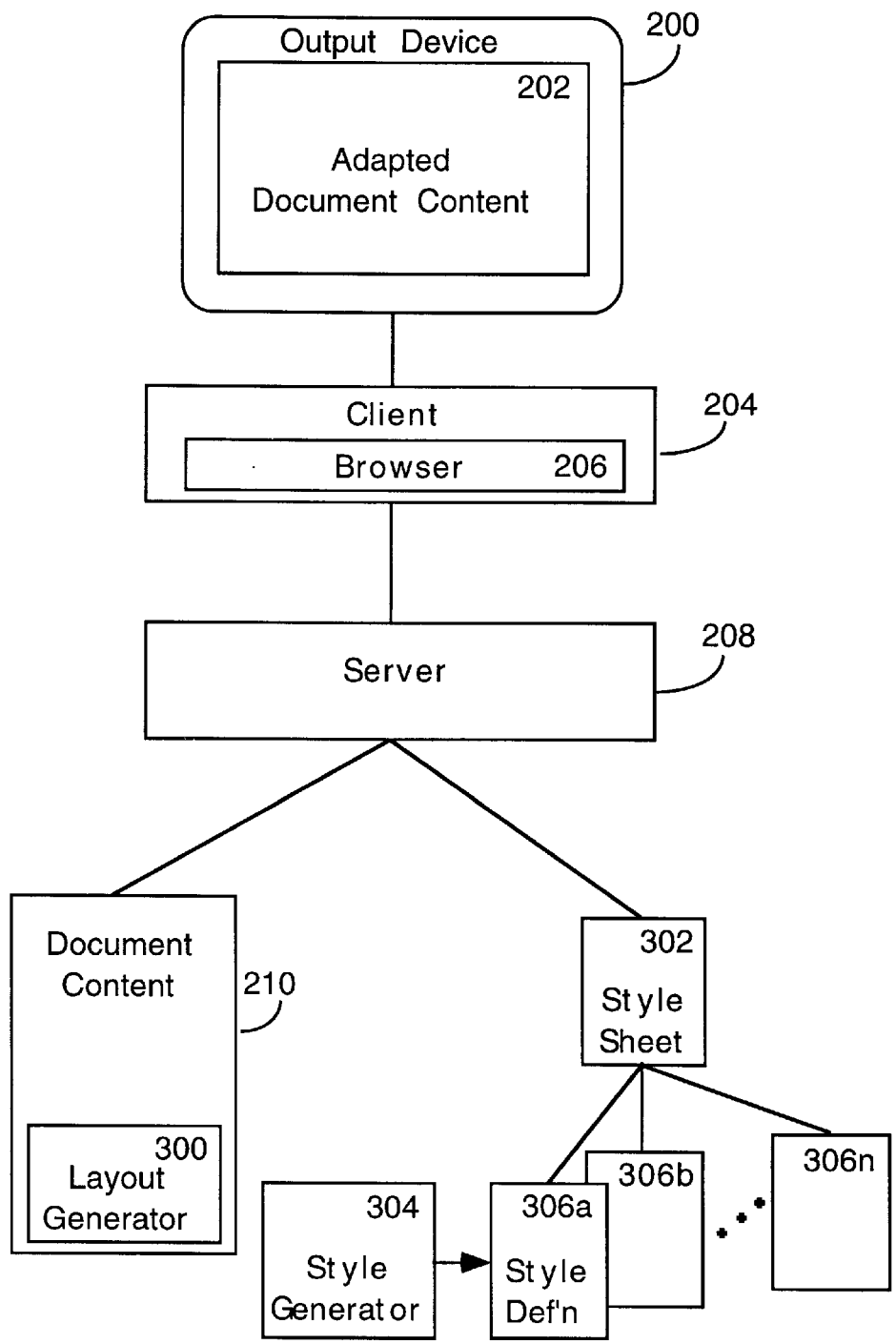
FIG. 3 is a block diagram illustrating another exemplary networking environment for an embodiment of the present invention.

Other networking environments may also support the adaptive display embodiment. FIG. 3 shows a second exemplary networking environment. In the networking environment illustrated in FIG. 3, the layout generator 300 contains a style generator 304. The layout generator 300 is similar to the previously described layout generator 212, except that this layout generator 300 creates a style sheet rather then selecting a previously created style sheet. The style generator 304 creates a style sheet 302 by generating a plurality of style definitions 306a, 306b . . . 306n. The layout generator 300 interrogates the display device 200 and generates style definitions 306a, 306b . . . 306n appropriate for the capabilities of the display device 200. A style definition defines a format value for a format property. Once the style definitions are generated, the style definitions 306a, 306b . . . 306n are collected in a style sheet 302. In other exemplary networking environments, the layout generator of FIG. 2 or FIG. 3 may be external to the document 210 rather than embedded in the document 210.

The layout generator illustrated in FIGS. 2 and 3 may be executed by either the client 204, in the client-controlled embodiment or the server 206, in the server-controlled embodiment. The inventors believe that the client-controlled embodiment is preferable for a network such as the Internet, whereas the server-controlled embodiment is preferable for an intranet environment.

Client-Controlled Embodiment

Figure 4:
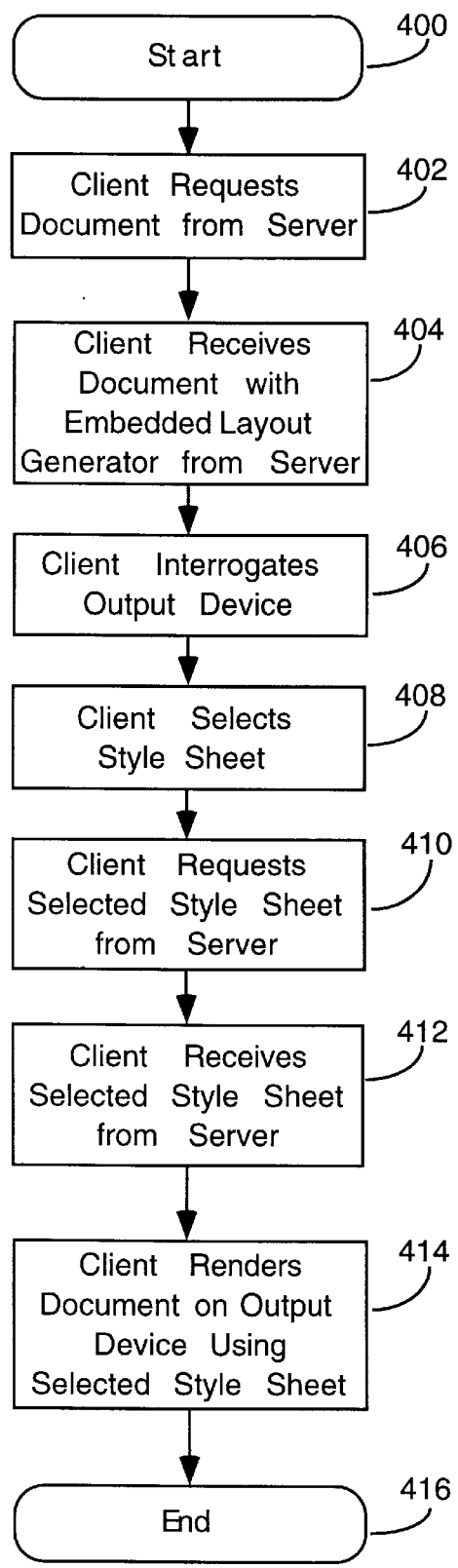
FIG. 4 is a logical flow diagram illustrating the steps for adapting the layout of a document for an output device in accordance with an exemplary client-controlled embodiment of the present invention.

FIG. 4 may be used to illustrate the steps of the client-controlled embodiment. The method begins at the START task of step 400. In step 402, the client requests a document stored on a remote storage device from the server. The client obtains the requested document including an embedded layout generator or script from the server in step 404. The layout generator is executed by the client in steps 406–410. In step 406, the layout generator interrogates the output device to determine the capabilities of the output device. For a display device, the capabilities include resolution, aspect ratio, physical size of display, physical size of the browser window, color depth, color palette and supported fonts.

After the capabilities of the output device are determined, then, in step 408, the layout generator selects a style sheet based upon the capabilities of the output device. A simple layout generator for a display device may select a style sheet based upon the resolution of the display device. For example, one style sheet may selected for a high resolution display device, a second style sheet may be selected for a medium resolution display device, and a third style sheet may be selected for a low resolution display device. More complex layout generators may select a style sheet based upon additional display capabilities.

Once the style sheet is selected, the client requests the selected style sheet from the server in step 410. The client receives the selected style sheet in step 412. After the client receives the selected style sheet, the client renders the document using the selected style sheet in step 414. When the client renders the document on the output device, the properties and values contained in the selected style sheet are used to adapt the format of the document content to the display device. The method ends at the END task of step 416.

In step 408, the layout generator selects a style sheet based upon the capabilities of the output device. Once the style sheet is selected, the style sheet must be linked to the document. Typically, the layout generator is a script, the document is an HTML document and the style sheets are CSS style sheets. The link tag may be used to link the CSS style sheet selected by the layout generator to the HTML document. If the HTML document contains a link tag, then the layout generator may place the selected style sheet at the URL specified in the HREF attribute of the link tag. For example, if the HTML document contains the link element shown below, then the layout generator selects a style sheet by placing the style sheet at the URL SelectedStylesheet.css.

<LINK TITLE="SelectedStylesheet" REL=stylesheet HREF="SelectedStylesheet.css" TYPE="text/css">

Alternatively, the layout generator may select a style sheet by modifying the HREF attribute of the link tag to specify the URL of the selected style sheet. For example, if the HTML document contains the link tag shown above, then the layout generator may select a style sheet located at the URL HiResStylesheet.css by modifying the HREF attribute of the link tag to HREF="HiResStylesheet.css".

The document, the layout generator and the style sheets may be created by the author. The author may create a layout generator which selects a different style sheet for each type of display. Alternatively, the author may create a layout generator which selects the same style sheet for all display devices with capabilities within a predetermined range. For example, the author may determine that a style sheet entitled "High Resolution" may be used for all display devices with resolutions within a first predetermined range, a style sheet entitled "Medium Resolution" may be used for all display devices with resolutions within a second predetermined range, and a style sheet entitled "Low Resolution" may be used for all other display devices. An authoring tool may assist the author in creating the layout generator and the style sheets. The layout generator may be designed to work with a particular document and a particular set of style sheets or style definitions. Alternatively, the layout generator may be a general purpose layout generator which is designed to work with multiple documents and different sets of style sheets or style definitions.

Server-Controlled Embodiment

Figure 5:
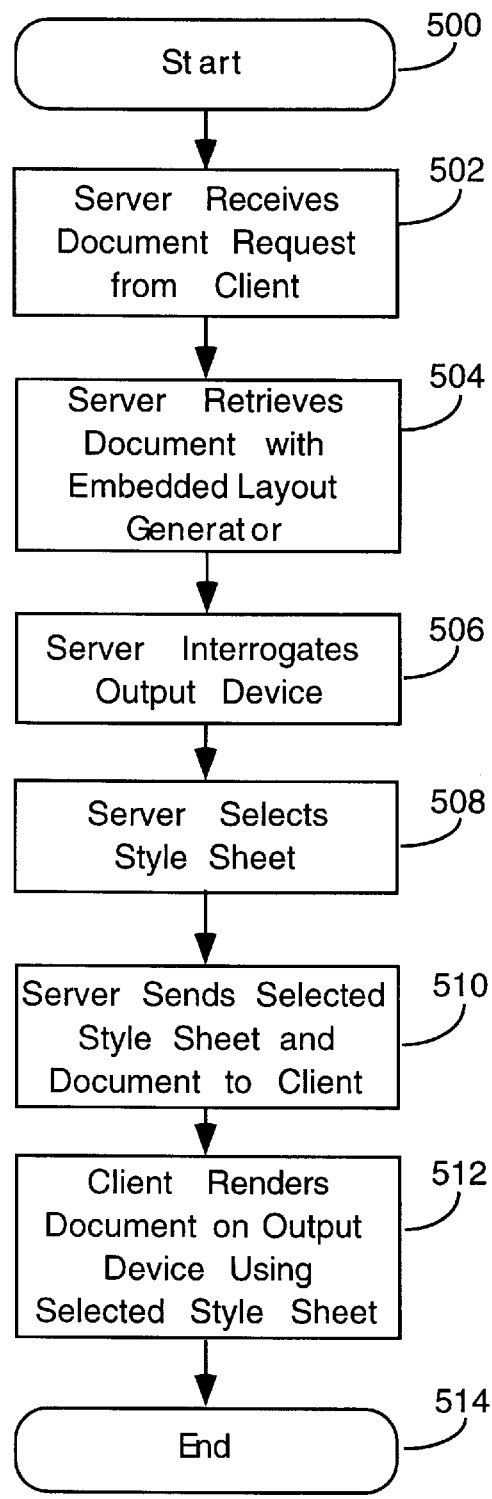
FIG. 5 is a logical flow diagram illustrating the steps for adapting the layout of a document for an output device in accordance with an exemplary server-controlled embodiment of the present invention.

The server-controlled embodiment is an alternative to the client-controlled embodiment discussed in the preceding paragraphs. FIG. 5 may be used to illustrate the steps of a server-controlled embodiment. The server-controlled embodiment begins at the START task of step 500. From step 500, the method proceeds to step 502 where the server receives a request from the client for a document. In response to the document request, the server obtains the document including an embedded layout generator or script in step 504. The layout generator is executed by the server in steps 506–510. The server interrogates the output device attached to the client in step 506 to determine the capabilities of the output device. For a display device, the capabilities include resolution, aspect ratio, physical size of display, physical size of the browser window, color depth, color palette and supported fonts. In the server-controlled embodiment, the client supplies the output device capability information to the server.

Once the capabilities of the output device are returned to the server, then, in step 508, the server selects a style sheet based upon the capabilities of the output device. As discussed in connection with the client-controlled embodiment, the layout generator may be a simple layout generator which selects a style sheets based upon a single capability or may be a complex layout generator which selects a style sheets based upon multiple capabilities. The style sheet selected by the layout generator may be linked to an HTML document using the link tag as described above in connection with the client-controlled embodiment. Once the style sheet is selected, the server sends the selected style sheet and the document to the client in step 510. In step 512, the client renders the document on the output device using the selected style sheet. The server-controlled embodiment ends at the END task of step 514.

Figure 6:
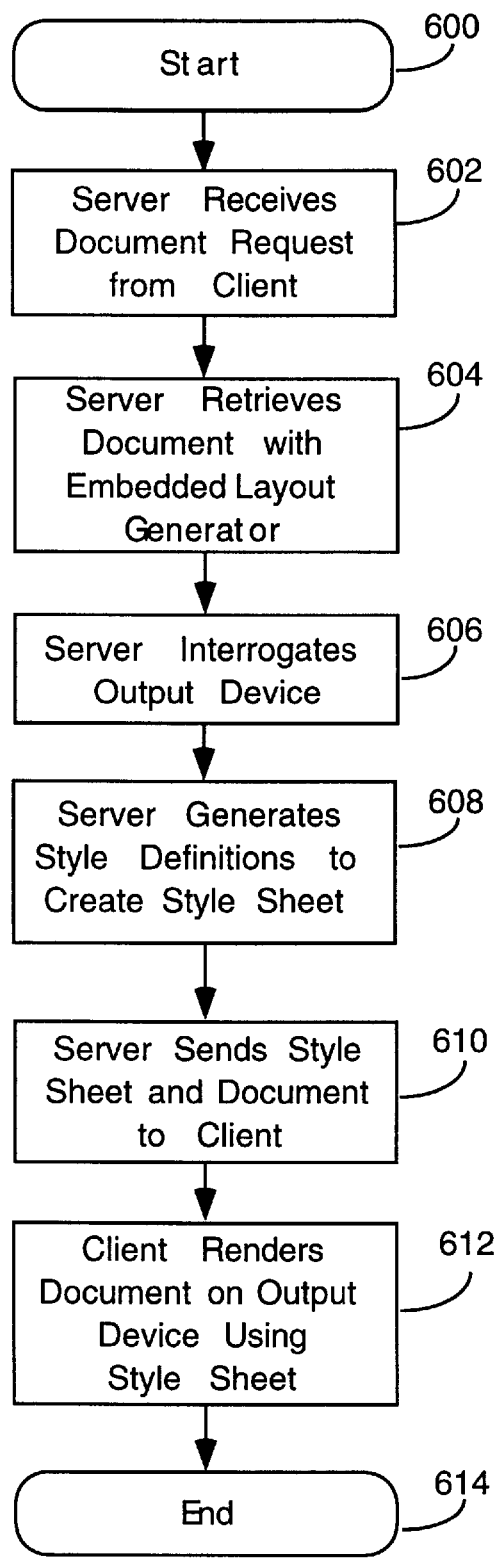
FIG. 6 is a logical flow diagram illustrating the steps for adapting the layout of a document for an output device in accordance with another exemplary server-controlled embodiment of the present invention.

A variation of the server-controlled embodiment illustrated in FIG. 5 is shown in FIG. 6. In the variation illustrated by FIG. 6, the layout generator includes a style generator. The style generator creates a style sheet using a plurality of style definitions, rather than selecting a style sheet from a plurality of style sheets. Steps 600–606 of FIG. 6 are similar to steps 500–506 described above in connection with FIG. 5. The method begins at step 600. In step 602, the server receives a request from the client for a document. In response to the document request, the server obtains the document including an embedded layout generator in step 604. The server executes the layout generator in steps 606–610. The layout generator interrogates the output device attached to the client in step 606. Once the capabilities of the output device are returned to the server, then, in step 608, the style generator generates a plurality of style definitions. The style definitions are used to create a style sheet. The capabilities of the output device determine which style definitions are generated. Typically, each style definition defines a value for a property of an HTML element. For example, one style definition may define values for a level-one header, a second style definition may define values for a paragraph, and a third style definition may define values for a table. Once the style sheet is completed, then the document and the style sheet are sent to the client in step 610. In step 612, the client renders the document on the output device using the selected style sheet. The method ends at the END task of step 614.

FIG. 6 illustrates a style generator that generates an external style sheet. For a given output device, the style sheet generated by the style generator of FIG. 6 may be similar to the style sheet selected by the layout generator of FIG. 5. The link tag may be used to link the style sheet generated by the style generator to an HTML document. If the HTML document contains the link element shown below, then the style generator may store the generated style sheet at the URL SelectedStylesheet.css to link the style sheet to the HTML document.

<LINK TITLE="Selected Stylesheet" REL=stylesheet HREF="SelectedStylesheet.css" TYPE="text/css">

Alternatively, the style generator may generate an embedded style sheet. If the style sheet is embedded in an HTML document, then the style generator modifies the HTML document to include style definitions in a style tag or in STYLE attributes. If a style tag is used, then the style definitions are included in the style tag. If STYLE attributes are used, then the appropriate STYLE attribute must be added to every HTML tag to which the style definitions apply.

The embodiments for adapting the layout of a document for a particular output device have been described using different types of layout generators (layout generators which select a style sheet, layout generators which include a style generator to create a style sheet) and different types of style sheets (external style sheets, embedded style sheets). In addition, the layout generators discussed above in connection with both the client-controlled embodiment and the server-controlled embodiment were embedded layout generators; however, a layout generator may be external to the document. If the layout generator is external to the document, then the layout generator must be linked to the document so that the layout generator is retrieved whenever the document is retrieved. In addition, although the style sheets and style definitions discussed above defined font properties, color and background properties, text properties and page properties, the style sheets and style definitions may include other format properties.

Different implementations of the embodiments may use different combinations of layout generators and style sheets. For example, one implementation may use the client-controlled embodiment with an embedded layout generator which selects an external style sheet, whereas a second implementation may use the server-controlled embodiment with an external layout generator which generates an external style sheet.

In summary, the present invention is directed toward a method and system for dynamically adapting the layout of a document to a particular display device. The present invention may be used to adapt the layout of an HTML document to fully utilize the capabilities of a display device. In the adaptive document layout embodiment, a layout generator interrogates the display device and selects a style sheet based upon the capabilities of the display device. The selected style sheet is used to display the document on the display device so that the document is formatted for that particular display device. Although the present invention has been described in connection with displaying an HTML document on a display device, those skilled in the art will recognize that the present invention may be used to adapt the layout of a document to any output device.

Alternative embodiments will become apparent to those skilled in the art to which the present invention pertains without departing from its spirit and scope. Accordingly, the scope of the present invention is described by the appended claims and is supported by the foregoing description.

What is claimed is:

1. In a computer network comprising a server system and a client system, a client-controlled method for formatting a document for presentation on an output device coupled to the client system comprising the steps of:

receiving the document and a layout generator from the server, the layout generator operative for selecting one of a plurality of style sheets based upon a capability of the output device;

receiving the selected style sheet from the server; and formatting the document for presentation on the output device using the selected style sheet.

2. The client-controlled method of claim 1, further comprising the step of using the layout generator to interrogate the output device to determine the capability of the output device prior to selecting one of the style sheets.

3. The client-controlled method of claim 1, wherein the layout generator is embedded in the document.

4. The client-controlled method of claim 1, wherein the layout generator is external to the document.

5. The client-controlled method of claim 1, wherein the output device is a display device and the capability of the output device is resolution.

6. The client-controlled method of claim 1, wherein the selected style sheet comprises a style definition which defines a format value for a format property, and wherein the format value is supported by the capability of the output device.

7. The client-controlled method of claim 6, wherein the format property is a text property.

8. The client-controlled method of claim 6, wherein the format property is a font property.

9. The client-controlled method of claim 6, wherein the format property is a color property.

10. The client-controlled method of claim 6, wherein the format property is a page property.

11. In a computer network comprising a server system and a client system, a server-controlled method for generating a style sheet used by the client system to format a document for presentation on an output device attached to the client system comprising the steps of:

retrieving the document and a layout generator; and using the layout generator to perform the steps of:

interrogating the output device coupled to the client system to determine a set of capabilities of the output device;

based upon the set of capabilities of the output device, generating a style sheet having a plurality of style definitions; and sending the style sheet and the document to the client system.

12. The server-controlled method of claim 11, wherein the output device is a display device and the set of capabilities comprises resolution and supported colors of the display device.

13. The server-controlled method of claim 11, wherein each of the style definitions assigns a format value to a format property, and wherein the step of generating a style sheet having a plurality of style definitions comprises generating a plurality of style definitions with format values supported by the set of capabilities of the output device.

14. The server-controlled method of claim 11, wherein the layout generator is embedded in the document.

15. The server-controlled method of claim 11, wherein the layout generator is external to the document.

16. The server-controlled method of claim 11, wherein the style sheet is embedded in the document.

17. The server-controlled method of claim 11, wherein the style sheet is external to the document.

18. A computer-readable medium having computer-executable instructions for formatting a document for an output device comprising:

a document component comprising document content;

a plurality of style sheet components, each style sheet component defining format values for a plurality of format properties;

a layout generator component for determining a capability of the output device and for selecting one of the style sheet components as a selected style sheet component based upon the capability of the output device; and a presentation component for formatting the document content for the output device using the selected style sheet component.

19. The computer-readable medium of claim 18, wherein the document component is a generalized markup language document.

20. The computer-readable medium of claim 18, wherein one of the format properties is a text property.

21. The computer-readable medium of claim 20, wherein one of the style sheet components defines a format value for a text property by defining a format value for letter spacing.

22. The computer-readable medium of claim 18, wherein one of the format properties is a font property.

23. The computer-readable medium of claim 22, wherein one of the style sheet components defines a format value for a font property by defining a format value for font size.

24. The computer-readable medium of claim 18, wherein one of the format properties is a color property.

25. The computer-readable medium of claim 24, wherein one of the style sheet components defines a format value for a color property by defining a format value for background color.

26. The computer-readable medium of claim 18, wherein one of the format properties is a page property.

27. The computer-readable medium of claim 26, wherein one of the style sheet components defines a format value for a page property by defining a format value for page margins.

28. A computer-readable medium having computer-executable instructions for formatting a document for an output device comprising:

a document component comprising document content;

a layout generator component for interrogating the output device to determine a capability of the output device and for generating a style sheet component based upon the capability of the output device; and a presentation component for formatting the document content for the output device using the style sheet component.

29. The computer-readable medium of claim 28, wherein the layout generator generates a style sheet component by selecting a style definition which defines a format value for a format property, the format value supported by the capability of the output device.

30. The computer-readable medium of claim 29, wherein the format property is selected from one of the following format properties:

a font property;

a color and background property;

a text property; and a page property.

31. The computer-readable medium of claim 29, wherein the output device is a display device, the format property is a font property, and the capability of the output device is high resolution, and wherein the layout generator generates a style sheet component by generating a style definition which defines a font value for a high resolution display device.

32. The computer-readable medium of claim 29, wherein the output device is a display device, the format property is a text property, and the capability of the output device is a resolution, and wherein the layout generator generates a style sheet component by:

if the resolution is within a first predetermined resolution range, then generating a style sheet definition which defines a text value for a high resolution display device;

if the resolution is within a second predetermined resolution range, then generating a style definition which defines a text value for a medium resolution display device; and if the resolution is within a third predetermined resolution range, then generating a style definition which defines a text value for a low resolution display device.

33. The computer-readable medium of claim 28, wherein the layout generator embeds the style sheet component in the document component.

34. The computer-readable medium of claim 28, wherein the style sheet component is external to the document component.

* * * * *